(12) United States Patent
Seibert et al.

(10) Patent No.: US 7,626,814 B2
(45) Date of Patent: Dec. 1, 2009

(54) SYSTEM AND METHOD FOR INFORMATION HANDLING SYSTEM BATTERY WITH INTEGRATED COMMUNICATION PORTS

(75) Inventors: Philip Seibert, Round Rock, TX (US); Johnny Fraga, Round Rock, TX (US)

(73) Assignee: Dell Products L.P., Round Rock, TX (US)

( * ) Notice: Subject to any disclaimer, the term of this patent is extended or adjusted under 35 U.S.C. 154(b) by 314 days.

(21) Appl. No.: 11/776,951

(22) Filed: Jul. 12, 2007

(65) Prior Publication Data

US 2009/0016015 A1    Jan. 15, 2009

(51) Int. Cl.
*H05K 5/00* (2006.01)
*H05K 7/00* (2006.01)

(52) U.S. Cl. .............. 361/679.45; 361/679.41; 361/679.32

(58) Field of Classification Search ............ 361/679.32, 361/679.41, 679.45
See application file for complete search history.

(56) References Cited

U.S. PATENT DOCUMENTS

| | | | |
|---|---|---|---|
| 4,709,202 A | 11/1987 | Koenck et al. | 320/43 |
| 5,206,097 A | 4/1993 | Burns et al. | 429/90 |
| 5,729,478 A * | 3/1998 | Ma et al. | 361/679.41 |
| 5,734,254 A | 3/1998 | Stephens | 320/106 |
| 6,307,745 B1 * | 10/2001 | Liebenow | 361/679.55 |
| 6,804,113 B2 * | 10/2004 | Kambayashi et al. | 361/679.45 |
| 6,894,893 B2 * | 5/2005 | Hidesawa | 361/679.55 |
| 2006/0250767 A1 * | 11/2006 | Brophy et al. | 361/686 |

* cited by examiner

*Primary Examiner*—Jayprakash N Gandhi
*Assistant Examiner*—Anthony M Haughton
(74) *Attorney, Agent, or Firm*—Hamilton & Terrile, LLP; Robert W. Holland

(57) ABSTRACT

Space along the perimeter of a portable information handling system is made available for I/O connections with external devices by integrating I/O ports into a battery housing having some length extending along the perimeter. The I/O ports interface with the information handling system with wires running through the battery housing from the I/O ports to a location aligned with connectors of the information handling system, such as in a chassis bay sized to accept the battery housing. In one embodiment, the battery housing has a first portion for containing battery cells and a second portion that couples to the first portion, the second portion having selected I/O ports for selective configuration of the information handling system with desired I/O ports.

11 Claims, 3 Drawing Sheets

SYSTEM AND METHOD FOR INFORMATION HANDLING SYSTEM BATTERY WITH INTEGRATED COMMUNICATION PORTS

BACKGROUND OF THE INVENTION

1. Field of the Invention

The present invention relates in general to the field of information handling system communications, and more particularly to a system and method for information handling system battery with integrated communication ports.

2. Description of the Related Art

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Information handling system users tend to prefer systems with as much processing power as possible in as small of a footprint as possible for a given price point. In addition, end users tend to prefer systems that provide mobility, such as portable systems that typically have an integrated display and a battery power source. As a result, information handling system manufacturers have generally sought to design portable information handling systems having as much functionality as possible in as small of a portable chassis as possible. One difficulty that commonly arises in the design of such portable information handling systems is including a battery having a charge sufficient enough so that the information handling system can operate independent of an external power source for an adequate period of time. One solution to this difficulty is to use components that consume reduced amounts of power; however, components that offer greater functionality, such as CPUs with more rapid clock speeds, also tend to consume greater amounts of power. Another solution is to use a battery that carries a greater charge; however, batteries with greater charge capacity tend to have a larger size. Including a battery with a larger size in a portable information handling system chassis tends to reduce the footprint available for components and, thus, tends to reduce the functionality of the information handling system.

In an effort to increase the room available for a battery within an information handling system, the battery is sometimes built into a housing that couples to an internal port of the information handling system at one end and extends out the rear of the information past the rear wall of the chassis. For example, an information handling system user can insert a six cell battery into a rear battery port that aligns with the rear wall of the chassis or can insert a nine cell battery into a rear battery port to obtain extra battery life with the rear wall of the battery extending past the rear wall of the chassis to provide room for the extra battery cells. In addition to providing more room for additional battery cells, a rear battery design is more conducive to slimming the industrial design of the front edge of the information handling system. Unfortunately, perimeter space for portable information handling systems is typically in short supply. A variety of I/O ports are typically disposed along the perimeter of a portable information handling system chassis, and a variety of internal and peripheral devices also typically use perimeter space, such as optical drives, hard disk drives, fan exhaust, etc. . . . Generally, the front perimeter of a portable information handling system does not adapt well to support I/O ports for aesthetic and practical reasons, so using valuable perimeter space at the rear of a portable information handling system to accept a battery tends to limit the functionality supported by the information handling system.

SUMMARY OF THE INVENTION

Therefore a need has arisen for a system and method which integrates I/O ports into a battery housing for use at the rear of a portable information handling system.

In accordance with the present invention, a system and method are provided which substantially reduce the disadvantages and problems associated with previous methods and systems for supporting communications with a portable information handling system. I/O ports are integrated in a battery housing to support communication between external devices and an information handling system with a communication interface established through the battery housing.

More specifically, an information handling system chassis has a bay sized to accept a battery. The battery has a battery housing that contains battery cells and connects to a power connector of the information handling system located in the bay so that the cells provide power to the information handling system. The battery housing integrates I/O ports along an exterior perimeter so that the I/O ports are exposed along the chassis perimeter when the battery is inserted in the chassis bay. Signals are communicated between the I/O ports and the information handling system with wires that run along the battery housing to I/O port connectors disposed in the chassis bay. As the battery is inserted into the chassis bay, the battery connectors and I/O port connectors between the battery housing and information handling system align and couple with each other. In one embodiment, the battery inserts into a chassis bay located at the rear of an information handling system so that I/O ports exposed along the outer periphery of the battery housing are disposed proximate the rear perimeter of the chassis for convenient access by an end user.

The present invention provides a number of important technical advantages. One example of an important technical advantage is that I/O ports are provided at the rear of a portable information handling system having a rear mounted battery. The use of a rear-mounted battery having integrated I/O ports provides more design freedom in the use of perimeter space to support desired functionality. End users can order ports integrated with a battery as a build-to-order option so that the cost of the information handling system is only selectively increased based on end-user preferences. By integrating lesser-used or duplicative ports in the battery housing, the cost for many end users will not increase for an information handling system having desired functionality, while the availability of extra battery life will provide increased satisfaction to many end users. The expense of the additional I/O ports will remain minimal by routing wire line at the battery housing between the I/O ports and supporting connections within the information handling system where the battery is inserted.

BRIEF DESCRIPTION OF THE DRAWINGS

The present invention may be better understood, and its numerous objects, features and advantages made apparent to those skilled in the art by referencing the accompanying drawings. The use of the same reference number throughout the several figures designates a like or similar element.

DETAILED DESCRIPTION

Providing I/O ports integrated in a battery housing increases the effective perimeter space of an information handling system for improved functionality in a reduced footprint. For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, and a video display. The information handling system may also include one or more buses operable to transmit communications between the various hardware components.

Figure 1:
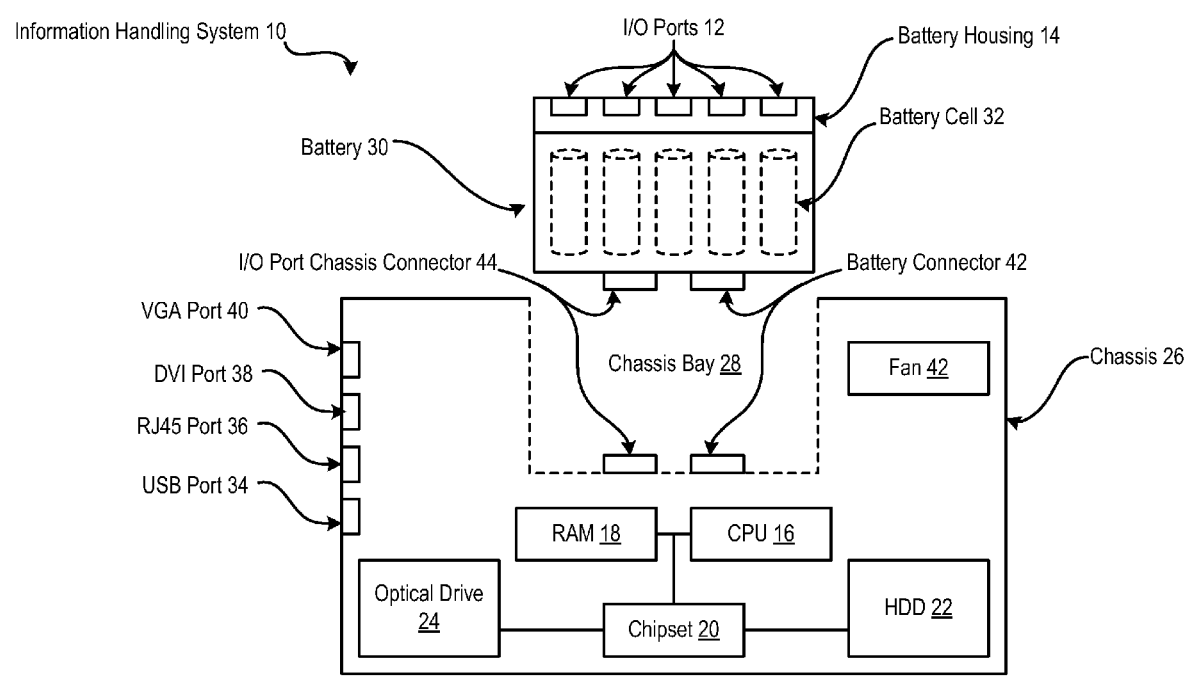
FIG. 1 depicts a block diagram of an information handling system having I/O ports integrated in a battery housing.

Referring now to FIG. 1, a block diagram depicts an information handling system 10 having I/O ports 12 integrated in a battery housing 14. Information handling system 10 has a variety of processing components that cooperate to process information, such as a CPU 16, RAM 18, a chipset 20, a hard disk drive 22 and an optical drive 24. The processing components are disposed in a chassis 26 having a chassis bay 28 that accepts a battery 30. Battery 30 provides power for the operation of the processing components with battery cells 32 contained in battery housing 14. The processing components communicate with external devices through a variety of I/O ports exposed along the perimeter of chassis 26. For example, a USB port 34 interfaces with a USB cable to support communication with a variety of peripheral devices, an RJ45 port 36 interfaces with a CAT 5 cable to support Ethernet network communications, and DVI port 38 and VGA port 40 interface with displays to support presentation of visual information from information handling system 10. In alternative embodiments, various types of I/O ports available to support communication with an information handling system might include HDMI ports, composite video ports, component video ports, S video ports, Firewire ports, PCI ports, PCI Express ports, DisplayPort ports and a variety of other types of ports. In addition to the I/O ports which generally need space along the perimeter of chassis 26, other devices that are typically located along the perimeter of chassis 26 include optical drive 24, which opens to accept optical media, and a fan 42 which maintains cooling airflow through chassis 26.

Information handling system 10 increases the amount of the perimeter of chassis 26 that can accept I/O ports by integrating I/O ports 12 in battery housing 14. Battery 30 is sized to fit in chassis bay 28 so that battery connectors 42 align between battery 30 and chassis bay 28 to provide power from battery 30 to information handling system 10. In addition to aligning battery connectors 42, battery 30 fits in chassis bay 28 to align I/O port connectors 44 between battery 30 and chassis bay 28 so that I/O signals are communicated from I/O ports 12 integrated in battery housing 14 to processing components of information handling system 10. I/O ports 12 integrated in battery housing 14 may include any of the ports listed above or other more specialized ports. In one embodiment, a manufacturer builds information handling system 10 to an end user order that defines the types of I/O ports 12 that are integrated in battery housing 14. For example, specialized I/O ports and I/O ports that are not commonly sought by end users are made available to end users at additional cost by including the I/O ports in a battery housing 14.

Figure 2:
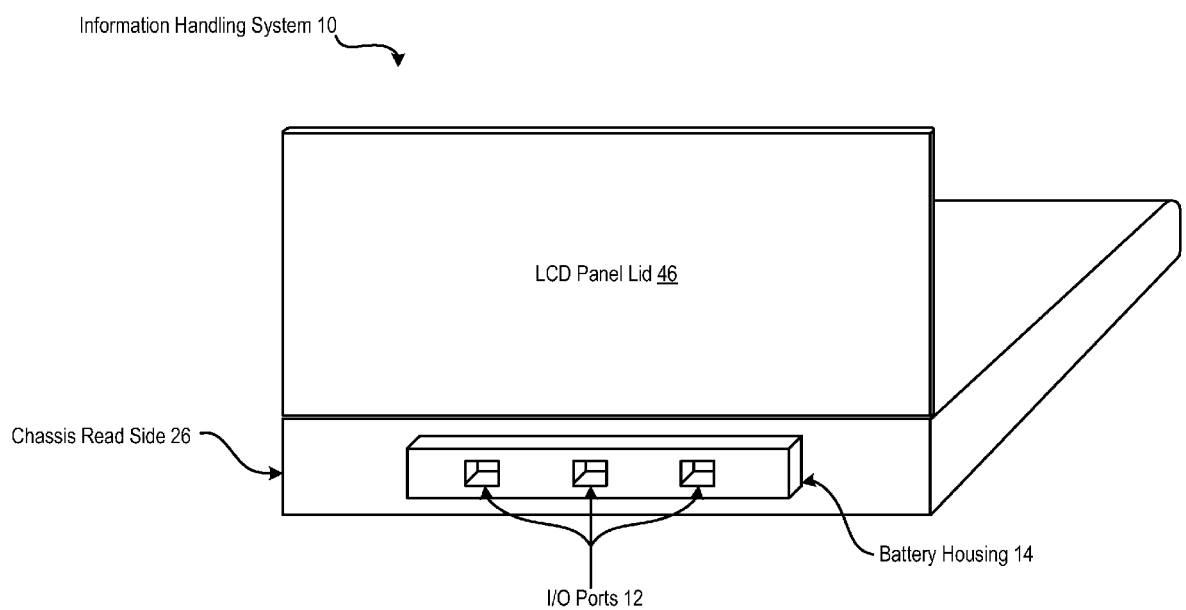
FIG. 2 depicts a rear view of an information handling system having I/O ports integrated in a battery housing.

Referring now to FIG. 2, a rear view is depicted of an information handling system 10 having I/O ports 12 integrated in a battery housing 14. An LCD panel lid 46 rotates relative to chassis 26 so that, at the front of information handling system 10, an end user has access to a keyboard and presentation of information by an LCD panel. Inserting battery housing 14 into a bay located at the rear of chassis 26 allows battery housing 14 to extend outward past the perimeter of chassis 26, allowing additional room for storing a battery charge without interfering with end user operation of information handling system 10. Integrating I/O ports 12 into battery housing 14 helps to make a rear battery chassis bay a more practical option by allowing the perimeter of battery housing 14 to be used to support I/O ports 12. As an example, an end user who selects a six cell battery will have the battery housing substantially align with the information handling system chassis so that I/O ports exposed at the battery housing appear to be located along the information handling system chassis. In contrast, an end user who selects a nine cell battery will have the battery housing extend outwards from the information handling system chassis to provide extra room for the additional three battery cells with the I/O ports available at the surface of the extended battery housing.

Figure 3:
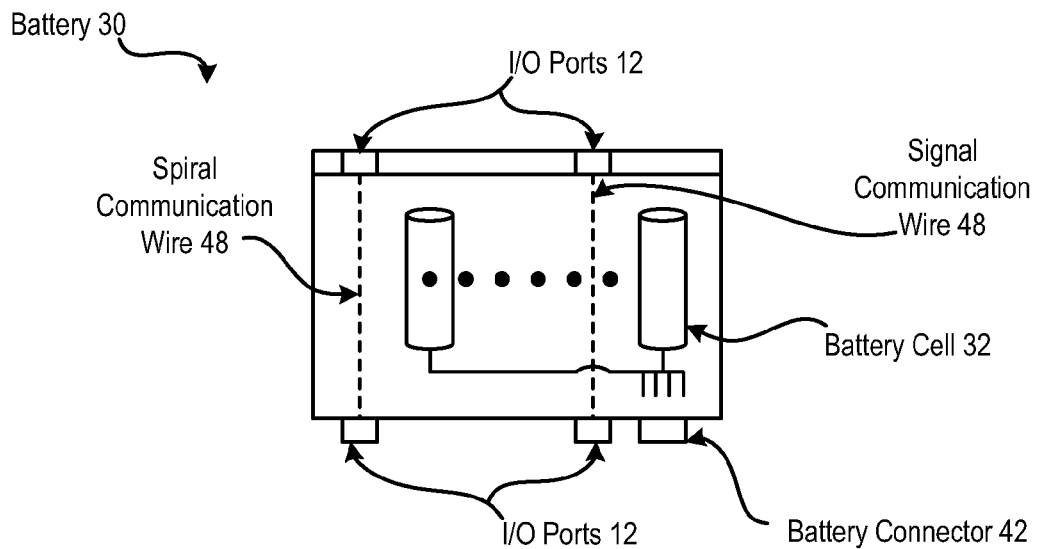
FIG. 3 depicts a battery housing having integrated I/O ports that interface with wires running through the housing to I/O ports that connect to I/O ports aligned in an information handling system chassis battery bay.

Referring now to FIG. 3, a battery housing 14 is depicted having integrated I/O ports 12 that interface with wires 48 running through housing 14 to I/O ports 12 that connect to I/O ports aligned in an information handling system chassis battery bay. Battery 30 is, for example, built with a contiguous battery housing 14 that contains battery cells 32 and that includes openings for I/O ports 12. Signal communication wires 48 run along the exterior surface of battery housing 14 to I/O ports 12 proximate battery connector 42 so that the wires will be hidden from view when the battery is inserted into an information handling system chassis. Alternatively, wires are incorporated within the battery housing, such as with a FPC or FFC. As battery 30 is inserted into an information handling system chassis bay, battery connector 42 and I/O ports 12 located at the interior of the chassis bay align with and couple to a battery connector and I/O ports of the information handling system. Signal communication wires 48 are hidden from view within the chassis bay. When an end user interfaces a cable with an I/O port 12 on the exposed portion of battery housing 14, signals from the cable proceed through signal communication wires 48 to I/O ports 12 located at the interior portion of battery housing 14 for communication with the information handling system. Similarly, signals generated at the information handling system for communication to an external device are sent from I/O ports of the information handling system located within the chassis bay to I/O ports 12 at the interior location of battery housing 14. The information handling system signals are communicated across signal communication wires 48 to I/O ports 12 at the exterior portion of battery housing 14 for communication with exterior devices through cables couple to the exterior I/O ports 12.

Figure 4:
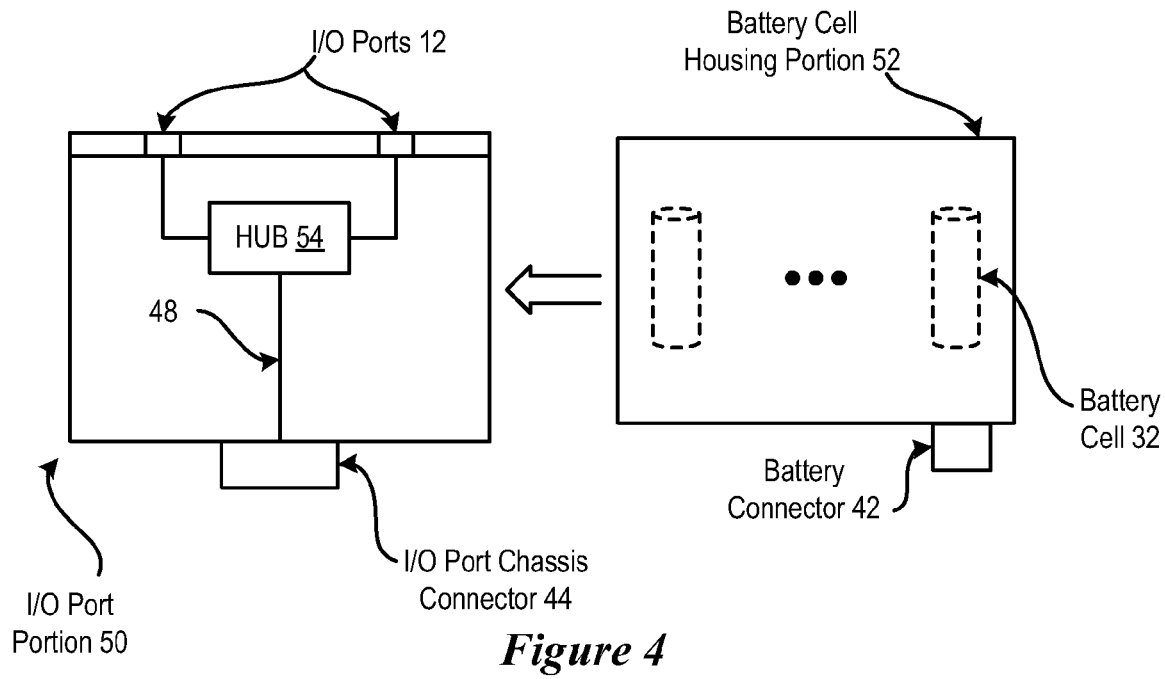
FIG. 4 depicts a battery housing having a first portion for supporting I/O ports and a second portion for supporting battery cells.

Referring now to FIG. 4, a battery housing 14 is depicted having a first I/O port portion 50 for supporting I/O ports 12 and a second battery cell housing portion 52 for supporting battery cells 32. The example embodiment depicted by FIG. 4 has a hub 54 that interfaces with each I/O port 12 to consolidate signals for communication with an information handling system through a common signal communication wire 48. For example, hub 54 includes a PCI Express controller that accepts signals from plural exterior I/O ports 12 and translates the signals for communication over a common PCI Express link. As an alternative example, hub 54 is a USB hub that concentrates information received from plural USB I/O ports to a single USB connector interfaced with an information handling system. Battery cell housing portion 52 is sized to fit into I/O port portion 50 so that, when coupled together, the two portions form a battery housing 14. Separate housing portions allows assembly of various configurations of I/O ports and battery cells to provide increased flexibility to build information handling systems to order with I/O ports selected by an end user for integration along the outer surface of a battery 30.

Although the present invention has been described in detail, it should be understood that various changes, substitutions and alterations can be made hereto without departing from the spirit and scope of the invention as defined by the appended claims.

What is claimed is:

1. An information handling system comprising:
    a chassis having a front and a rear;
    plural processing components disposed in the chassis and operable to process information;
    a battery coupled in a bay formed in the chassis, the battery having a housing exposed proximate the rear of the chassis, the battery operable to provide power to the processing components; and
    one or more I/O ports disposed in the battery housing proximate the rear of the chassis, the I/O ports interfaced with the processing components and operable to couple to I/O connectors to support communication between external devices and the processing components; and a processor disposed in the battery housing, the processor interfaced with the I/O ports and with a link disposed in the chassis, the processor operable to translate signals communicated between the I/O ports and the link.

2. The information handling system of claim 1 wherein the one or more I/O ports comprise a USB port.

3. The information handling system of claim 1 wherein the one or more I/O ports comprise a Firewire port.

4. The information handling system of claim 1 wherein the one or more I/O ports comprise a PCI Express port.

5. The information handling system of claim 1 wherein the one or more I/O ports comprise a DisplayPort port.

6. The information handling system of claim 1 further comprising:
    one or more port connections disposed in the chassis bay; and
    one or more wire lines associated with the battery housing, the wire lines coupled to the one or more I/O ports, the wire lines interfacing the I/O ports with associated port connections disposed in the chassis bay.

7. The information handling system of claim 1 wherein the battery housing comprises a first portion coupled to a second portion, the first portion containing battery cells, the second portion containing the I/O ports.

8. The information handling system of claim 1 wherein the processor disposed in the battery housing comprises a PCI Express controller and the link disposed in the chassis bay comprises a PCI Express link.

9. An information handling system battery comprising:
    one or more battery cells operable to store a charge;
    a housing enclosing the battery cells, the housing sized to fit in an information handling system chassis bay;
    a battery connector integrated in the housing and interfaced with the battery cells, the battery connector aligned to couple with an information handling system battery connector located in the chassis bay; and
    one or more ports integrated in the housing to be exposed upon installation of the housing into the chassis bay, the port operable to accept communication signals and to forward the communication signals to the information handling system through the chassis bay, wherein the housing comprise a first portion coupled to a second portion, the first portion enclosing the battery cells, he second portion having the port and one or more wires proceeding from the port to a location aligned to couple to wires in the information handling system chassis.

10. The information handling system battery of claim 9 further comprising a hub disposed in the second portion, the hub operable to translate signals received at the port to a format received at the information handling system.

11. The information handling system battery of claim 10 wherein the hub comprises a PCI Express controller.

* * * * *